474-136 SR

MTR06 OR RE 1,144

R. B. Burchell,

Curtain-Cord Tightener,

No. 1144 Reissued Feb. 26, 1861

Witnesses:

William Caughey

Richard Ira Eyster

Inventor:

Richd B Burchell

UNITED STATES PATENT OFFICE.

RICHARD B. BURCHELL, OF BROOKLYN, NEW YORK.

IMPROVED WINDOW-CURTAIN FIXTURE.

Specification forming part of Letters Patent No. 29,461, dated August 7, 1860; Reissue No. 1,144, dated February 26, 1861.

*To all whom it may concern:*

Be it known that I, RICHARD B. BURCHELL, of Brooklyn, (E. D.,) in the county of Kings and State of New York, have invented a new and useful Improvement in Tighteners for the Cords of Curtains; and I do hereby declare that the following is a full, clear, and exact description of the same, reference being had to the annexed drawings, making part of this specification, in which—

Figure 1:
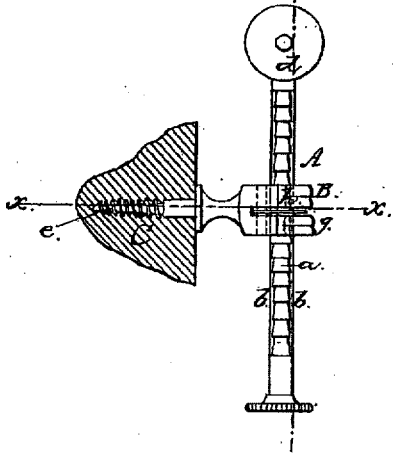
Figure 2:
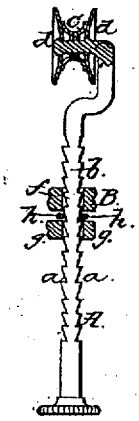
Figure 3:
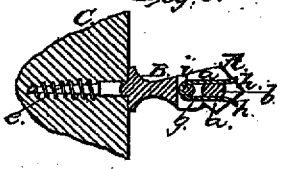

Figure 1 is an elevation of my invention. Fig. 2 is a sectional elevation of the same, and Fig. 3 is a horizontal section of the same taken in the line *x x* of Fig. 1.

Similar letters of reference indicate corresponding parts in the several figures.

This invention relates to an improvement in that portion of shade-fixtures which is employed to retain in proper position and keep "taut" the roller-cord. The object of the invention is to facilitate the adjustment of the rod which carries the pulley around which the lower part of the cord passes, so that the latter may be readily strained or tightened and also released, as occasion may require.

To enable those skilled in the art to fully understand and construct my invention, I will proceed to describe it.

A represents a rod, which has a rack, *a*, cut or formed on one or more sides of it, said rack being of cylindrical shape, and therefore having two racks, *a a*, and two smooth convex surfaces, *b b*, all of which are shown in Fig. 2. On the upper part of the rod A there is fitted a pulley, *c*. This pulley may be fitted between two stationary guards or cheek-pieces, *d d*, in order that the roller-cord which passes around the pulley *c* may be kept thereon. (See Fig. 2.)

B is a bar or bracket, which is provided with a tang or screw, *e*, by which the bracket may be secured horizontally to the window-casing C. This bracket or eye has a vertical hole, *f*, to allow the rod A to pass through, and in this bracket there is a slot, *g*, containing horizontal pawls *h h*, one at each side of the rod A. These pawls are elastic, being formed by a bent spring, and both pawls have a tendency to engage with the racks *a* of the rod A. The pawls may be constructed of steel wire, bent in U form, as shown clearly in Fig. 3, and retained in place by a pin, *i*.

From the above description it will be seen that the roller-cord may be readily tightened by drawing down the rod A through the eye B, while the pawls *h h* are engaged with the racks *a a*, so that the said pawls *h h* hold or retain the rod. When, however, it is desired to release the cord for the removal of the shade-roller, around which the upper part of the shade-cord passes, the rod A is simply turned in its bracket B, so that the smooth parts *b b* of the former will be opposite the pawls and the rod may be shoved directly upward as the racks are turned away from the pawls, and said pawls merely bearing against the smooth portions of the bar and forming no appreciable resistance to its movement. One rack, *a*, might be made to answer instead of two, but two would be preferable.

Having thus described my said invention, what I claim, and desire to secure by Letters Patent, is—

1. The arrangement of the rod A, pulley *d*, and stationary eye B, in substantially the manner specified, for forming a tightener for the cords of curtains, wherein said cord can be tightened or slackened by sliding the said rod through the eye, as specified.

2. In a tightener for the cords of curtains, forming the rod A with ratchet-teeth and a smooth surface or surfaces, in combination with a pawl or pawls, substantially as specified, whereby the said rod A can be moved in either direction when turned so that the pawl or pawls are in contact with the smooth surface or surfaces, as and for the purposes specified.

In witness whereof I have hereunto set my signature this 28th day of January, 1861.

RICHD. B. BURCHELL.

Witnesses:

LEMUEL W. SERRELL,
THOS. GEO. HAROLD.